(12) United States Patent
Sonnek et al.

(10) Patent No.: US 11,206,154 B2
(45) Date of Patent: Dec. 21, 2021

(54) PROGRAMMABLE PLUG

(71) Applicant: Webasto SE, Stockdorf (DE)

(72) Inventors: Sebastian Sonnek, Stockdorf (DE); Konrad Schlögl, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 52 days.

(21) Appl. No.: 16/611,438

(22) PCT Filed: May 4, 2018

(86) PCT No.: PCT/EP2018/061529
§ 371 (c)(1),
(2) Date: Nov. 6, 2019

(87) PCT Pub. No.: WO2018/206436
PCT Pub. Date: Nov. 15, 2018

(65) Prior Publication Data
US 2020/0067728 A1    Feb. 27, 2020

(30) Foreign Application Priority Data

May 8, 2017    (DE) ..................... 10 2017 109 862.3

(51) Int. Cl.
*H04L 12/46*    (2006.01)
*H04L 12/40*    (2006.01)
*B60H 1/00*    (2006.01)

(52) U.S. Cl.
CPC ........... *H04L 12/46* (2013.01); *B60H 1/0073* (2019.05); *H04L 12/40032* (2013.01);
(Continued)

(58) Field of Classification Search
CPC ............... H04L 12/46; H04L 12/40032; H04L 12/40169; H04L 2012/40273;
(Continued)

(56) References Cited

U.S. PATENT DOCUMENTS 8,081,736 B2    12/2011  Blechschmidt
9,604,522 B2 *   3/2017  Geissenhoener ...... G08C 17/02
(Continued)

FOREIGN PATENT DOCUMENTS

CN    101542652 A    9/2009
CN    101690019 A    3/2010
(Continued)

OTHER PUBLICATIONS

Gornicki, D. "GSM Fernsteueuerung, Version W-Bus v9.x, Bedienungsanleitung", Oct. 1, 2015. Retrieved from the Internet: url:www.danhag.de (Retrieved on Jun. 20, 2018).
(Continued)

*Primary Examiner* — Rasheed Gidado
(74) *Attorney, Agent, or Firm* — Quarles & Brady LLP (57) ABSTRACT

A gateway device for controlling an air-conditioning device of a vehicle, a vehicle having such a gateway device and a method for starting up an air-conditioning device in a vehicle. The gateway device includes at least one plug-in contact for connecting the gateway device to an air-conditioning device and/or to a vehicle component, a reception unit for receiving configuration data for selecting a plug configuration of the gateway device, a configuration circuit associated with the plug-in contact, that is designed to take configuration data as a basis for changing between at least one first switching state of the plug-in contact, in which the plug-in contact is designed to perform a first function, and at least one second switching state of the plug-in contact, in which the plug-in contact is designed to perform a second function.

20 Claims, 3 Drawing Sheets

(52) U.S. Cl.
CPC .................. *H04L 12/40169* (2013.01); *B60H 2001/00733* (2019.05); *H04L 2012/40215* (2013.01); *H04L 2012/40234* (2013.01); *H04L 2012/40273* (2013.01)

(58) Field of Classification Search
CPC  H04L 2012/40215; H04L 2012/40234; B60H 2001/00733; B60H 1/0073
See application file for complete search history.

(56) References Cited

U.S. PATENT DOCUMENTS

| | | | | |
|---|---|---|---|---|
| 2008/0206433 | A1* | 8/2008 | Kushner | A23C 11/103 426/598 |
| 2009/0105927 | A1* | 4/2009 | Arai | B60H 1/00978 701/102 |
| 2010/0318250 | A1* | 12/2010 | Mitsutani | B60L 58/24 701/22 |
| 2011/0103618 | A1* | 5/2011 | Lemellat | H04H 60/04 381/119 |
| 2012/0063499 | A1* | 3/2012 | Zojer | H04M 3/305 375/224 |
| 2014/0055899 | A1* | 2/2014 | Gruber | H02H 9/025 361/91.6 |
| 2014/0169211 | A1* | 6/2014 | Harper | H04L 45/02 370/254 |
| 2014/0288772 | A1* | 9/2014 | Makabe | B60K 17/00 701/36 |
| 2017/0151855 | A1* | 6/2017 | Kim | H01L 27/14636 |
| 2020/0245234 | A1* | 7/2020 | Omiya | H04W 4/04 |

FOREIGN PATENT DOCUMENTS

| | | |
|---|---|---|
| CN | 203968131 U | 11/2014 |
| CN | 104253471 A | 12/2014 |
| CN | 104423285 A | 3/2015 |
| DE | 102012222069 A1 | 6/2014 |
| DE | 102013210064 A1 | 12/2014 |
| DE | 102014210023 A1 | 11/2015 |
| EP | 2061206 A1 | 5/2009 |

OTHER PUBLICATIONS

International Searching Authority. International Search Report and Written Opinion for application PCT/EP2018/061529. dated Jun. 28, 2018. With translation.

German Patent and Trademark Office. Office Action for application DE102017109862.3. dated Apr. 17, 2018. With machine translation.

The State Intellectual Property Office of People's Republic of China, First Office Action and Search Report, Application No. 201880038339.7, dated Mar. 23, 2021, 11 pages.

* cited by examiner

PROGRAMMABLE PLUG

CROSS-REFERENCE TO RELATED APPLICATIONS

This application represents the national stage entry of PCT International Patent Application No. PCT/EP2018/061529 filed on May 4, 2018 and claims priority to German Patent Application No. DE 10 2017 109 862.3 filed May 8, 2017. The contents of each of these applications are hereby incorporated by reference as if set forth in their entirety herein.

DESCRIPTION

The disclosure relates to a gateway device for controlling an, in particular retrofitted, air-conditioning device of a vehicle, to a vehicle having such a gateway device and to a method for starting up an air-conditioning device in a vehicle.

When retrofitting an air-conditioning device, in particular an independent vehicle heater or a supplementary heater, various components for the air-conditioning device need to be fitted in a vehicle retrospectively and connected to various components of the vehicle that have already been installed at the factory, such as for example to the vehicle battery, the fuel tank, a fan or a ventilator flap of the vehicle. In particular connecting a retrofittable air-conditioning device to the existing vehicle electrics or electronics is complicated, sophisticated and susceptible to error.

The wiring in vehicles is firstly vehicle-specific, i.e. dependent on the vehicle manufacturer and on the vehicle model, in respect of the transmitted signals, the connections used and the lines laid. Secondly, different signals, connections and lines can be provided for or necessary for different retrofittable air-conditioning devices, in particular different types and models of independent vehicle heaters or supplementary heaters, in each case. The wiring for the retrofit is thus also specific to the air-conditioning device. Often, connections existing in the vehicle are not compatible with the connections of a retrofittable air-conditioning device. In modern vehicles, bus systems are used for communication between the different components of the vehicle. The bus systems of a vehicle can be relevant to safety. They are frequently not readily accessible for retrofittable components.

Today, retrofitting an air-conditioning device frequently requires existing communication lines to be severed or cut in order to insert suitable connections for a retrofittable air-conditioning device. Such actions during the retrofit can cause malfunctions in the existing vehicle-internal communication if they are not taken correctly. Additionally, installing and starting up a specific air-conditioning device for each vehicle requires different vehicle-specific technical circumstances to be taken into consideration in each case. This makes the retrofitting complicated and time-consuming.

Against the background of this prior art, the object of the present disclosure is to allow an air-conditioning device to be retrofitted in a vehicle more safely, more easily and more quickly. In particular, the aim is for different air-conditioning devices to be able to be installed in different vehicles easily and quickly.

This object is achieved by a gateway device in accordance with claim 1.

In particular, the object is achieved by a gateway device for controlling an, in particular retrofitted, air-conditioning device of a vehicle, comprising:
- at least one plug-in contact for connecting the gateway device to an air-conditioning device and/or to a vehicle component;
- a reception unit for receiving configuration data for selecting a plug configuration of the gateway device;
- a configuration circuit, associated with the plug-in contact, that is designed to take configuration data as a basis for changing over between at least one first switching state of the plug-in contact, in which the plug-in contact is designed to perform a first function, and at least one second switching state of the plug-in contact, in which the plug-in contact is designed to perform a second function.

The gateway device is in particular designed to produce control commands for controlling an air-conditioning device, such as for example an independent vehicle heater or supplementary heater. A plug-in contact is in particular electrically conductive, preferably in the form of a connector pin, preferably made of a metal material. In particular, the plug configuration relates to an interconnection and/or use of the at least one plug-in contact. A plug configuration can be understood to mean for example the definition of a plug-in contact as an input or output, as an analogue or digital connection and/or the assignment of a specific signal form or signal level, in particular voltage value, to a plug-in contact. Preferably, there is provision for multiple plug-in contacts. The gateway device can additionally also have plug-in contacts that have no associated configuration circuit, i.e. plug-in contacts that are not configurable. A vehicle component can be understood to mean for example a vehicle battery, a vehicle earth connection, a ventilator flap, a fan or a vehicle-internal data bus, while the air-conditioning device comprises in particular a heater, at least one air-conditioning bus line and/or an operator control element.

According to the disclosure, the configuration data can comprise control commands for selecting a plug configuration of the gateway device, and/or control commands can be produced on the basis of the configuration data. In particular, the gateway device comprises a data memory for storing the configuration data, wherein in particular stored configuration data are read and/or processed further in order to take them as a basis for selecting a plug configuration. Configuration data contain in particular vehicle-specific and/or air-conditioning-device-specific information about existing and required lines, connections and signals. In particular, the configuration data contain information concerning what form a specific plug-in contact of the gateway device needs to be in so that a specific vehicle component or an air-conditioning device, or a component of the air-conditioning device, is connectable to the plug-in contact in a functioning manner.

One concept of the disclosure is to provide a gateway device having at least one programmable plug-in contact that can perform multiple functions, in particular a dual function, comprising a first function and a second function, depending on what function is required for controlling an actual air-conditioning device in an actual vehicle. For this purpose, the plug-in contact has an associated configuration circuit that can connect up the plug-in contact differently, namely at least either in a first or a second switching state, depending on the required function of the plug-in contact, on the basis of configuration data, preferably without manual intervention. In particular, the plug-in contact is able to be changed over between a first switching state and a second switching state. Preferably, configuration data suited to one vehicle and one air-conditioning device are transmitted to the gateway device by means of a piece of configuration software, wherein the gateway device connects the configuration circuits as appropriate and thus sets a desired plug configuration. A configuration circuit preferably comprises at least one transistor stage. By way of example, an external data memory saves configuration data that relate to a multiplicity of possible combinations of vehicle models and different, in particular retrofittable, air-conditioning devices. A gateway device according to the disclosure having configurable plug-in contacts has the advantage that it is able to be used very flexibly for a multiplicity of different vehicle models and air-conditioning devices. With the gateway device as a standard hardware component, it is more easily and more quickly possible to retrofit an air-conditioning device in a vehicle, since the plug configuration of a gateway device is configurable for any installation situation, depending on the case, so that the gateway device provides suitable connections in each case. By way of example, wiring harnesses that are provided in a manner specific to a vehicle and/or an air-conditioning device and are connectable to the suitably configured gateway can significantly shorten the installation time for a retrofittable air-conditioning device.

In one advantageous development of the disclosure, the plug-in contact is in the form of an output contact in a first switching state and in the form of an input contact in a second switching state. In particular, the plug-in contact is designed for general purpose input/output (GPIO), the function of the plug-in contact as an input or output being able to be changed over by the configuration circuit. A plug-in contact preferably has an associated integrated circuit, in particular having at least one transistor, in order to apply an output voltage to a plug-in contact or to read an input voltage present on a plug-in contact. By way of example, a configuration circuit comprises a switchable "pull-up" and/or "pull-down" resistor in order to define a basic state, in particular a basic voltage level, of an input contact. Such a gateway device is flexibly configurable, depending on which inputs or outputs are needed for connecting an air-conditioning device in a vehicle in an actual case.

In one advantageous development of the disclosure, the plug-in contact is in the form of an analogue connection in a first switching state and in the form of a digital connection in a second switching state. In particular, a plug-in contact can be designed for digital bus communication or for transmitting a pulse-width-modulated (PWM) signal. A plug-in contact can be in the form of an input or output for an analogue voltage signal, preferably an analogue measurement signal, for example of an external temperature sensor. Such a gateway device is flexibly configurable, depending on what kind of signals, in particular voltage signals, need to be transmitted for operation of an air-conditioning device in a vehicle in an actual case.

In one advantageous development of the disclosure, the plug-in contact is able to have a first voltage value applied to it or tapped off from it in a first switching state and a second voltage value applied to it or tapped off from it in a second switching state. Preferably, a voltage value can be regulable, in particular continuously, between 0 and 48 volts, in particular between 0 and 32 V. In particular, switching states can accommodate set voltage values that correspond to a supply voltage of the gateway device and/or of a vehicle battery, for example 12 V, 24 V, 32 V or 48 V. In particular, the plug-in contact is in the form of a data bus connection for bidirectional data communication, preferably in the form of a CAN bus connection. In particular, voltage values are able to be set that correspond to standardized voltages for a bus communication, for example of 1.5 V for a CAN-low plug-in contact, 3.5 V for a CAN-high plug-in contact and 2.5 V for an idle state, or different voltage values for a bus communication that are typically used by one specific vehicle manufacturer. In particular, a configuration circuit can define maximum admissible voltage values. Such a gateway device has the advantage that incoming or outgoing voltage signals on the plug-in contacts are flexibly selectable in a manner specific to the vehicle and/or air-conditioning device and safe operation is possible in this case.

In one advantageous development of the disclosure, the plug-in contact is in the form of a data bus connection for bidirectional data communication, in particular in the form of a LIN bus connection, in a first switching state and designed to transmit a PWM signal or in the form of a proprietary bus connection in a second switching state. A proprietary bus connection is for example a W bus, in particular for communication with an air-conditioning device, in particular a heater of an independent vehicle heater or of a supplementary heater, or an operator control element. In particular, such a plug-in contact has a dual function as a data bus connection for communication or as an input or output for a PWM signal, in particular for controlling a vehicle component, such as a ventilator flap or a fan, or a component of an air-conditioning device. A LIN bus connection is operated for example at a supply voltage, in particular either 12 V or 32 V. A configuration circuit for generating a PWM signal is in particular designed such that the duty factor of the PWM signal is freely selectable and/or the amplitude voltage can be up to the level of the supply voltage of the gateway device, e.g. 12 V, 24 V, 32 V or 48 V. The gateway device can comprise multiple plug-in connections that are configurable either as a LIN bus connection or as a proprietary bus connection, in particular as a W bus connection. In this manner, the plug configuration of the gateway device is flexibly programmable or selectable for different applications.

In one advantageous development of the disclosure, the plug-in contact is connected up to a first bus terminating resistor in a first switching state and to a second bus terminating resistor in a second switching state. In this manner, the bus termination of a data bus line connectable to the plug-in contact is selectable. A configuration circuit comprises for example a switchable terminating resistor of 120Ω, in particular for a plug-in contact configured as a CAN bus connection, or switchable 1-kΩ, 10-kΩ and/or 30-kΩ terminating resistors, in particular for a plug-in contact configurable as a LIN bus connection or W bus connection. A selectable termination allows the disturbance of the bus communication to be prevented on the basis of the data bus system to be connected to a plug-in contact.

In one advantageous development of the disclosure, the reception unit is designed to receive configuration data wirelessly, in particular by means of Bluetooth. It is conceivable to transmit configuration data to the gateway device via a cable connection. Preferably, however, there is provision for a data transmission via a radio connection, for example via Bluetooth, WLAN or Wifi, LTE or GSM, wirelessly. Preferably, the gateway device comprises a Bluetooth receiver. In this manner, the gateway device is easily configurable, in particular in the already fitted state.

In one advantageous development of the disclosure, the gateway device comprises at least one temperature sensor for recording a component temperature, for example of a bus transceiver. In particular, a temperature sensor is associated with a plug-in contact in order to protect the plug-in contact and/or the configuration circuit associated with this plug-in contact against overheating, for example on account of a short. A temperature sensor can be part of a configuration circuit, in particular can be integrated in a subassembly thereof. By way of example, the temperature of a bus transceiver, in particular of a driver chip, can be monitored by a temperature sensor. There can be provision for further temperature sensors, e.g. for monitoring a microcontroller or a power management integrated circuit (PMIC). A temperature sensor has the advantage that a subassembly temperature can be recorded and monitored, with disconnection of the plug-in contact being performed, in particular on the basis of a control program of the gateway device, in the event of overheating. Protection of the plug-in contacts allows undesirable intervention in vehicle-internal systems to be avoided.

In one advantageous development of the disclosure, a plug-in contact is connected to a self-resetting fuse that preferably has a PTC thermistor, in particular in the form of a conductive polymer. A self-resetting fuse comprises in particular a PTC (positive temperature coefficient) resistor, e.g. comprising silicon, a ceramic or a polymer, and interrupts a circuit in the event of overheating. In particular, a configuration circuit is designed such that the plug-in contact is protected against a short, for example in the event of incorrect wiring or incorrect configuration. A self-resetting fuse has the advantage that the gateway device is protected against overheating caused by an overvoltage on account of a component incorrectly connected to a plug-in contact, for example, but can be operated in regular fashion again following disappearance of the fault. Protection of the plug-in contacts allows undesirable intervention in vehicle-internal systems to be avoided.

In one advantageous development of the disclosure, a plug-in contact in the form of an output contact has an associated checking circuit designed to tap off the output voltage present on the plug-in contact and in particular to compare it with a stipulated admissible output voltage. A checking circuit makes it possible to ensure that the gateway device does not transmit any undesirable, in particular excessively high, voltage signals to a vehicle that can lead to a malfunction.

In one advantageous development of the disclosure, at least one plug-in contact is designed to be configured for connecting a hardware module, such as e.g. a piggyback module. Such a hardware module can be designed to provide wireless interfaces, such as for example a GSM, LTE, Wifi and/or GPS module. Additionally, such a hardware module can be designed to extend wired interfaces by additional functions, such as e.g. communication via Ethernet and/or USB.

In one advantageous development of the disclosure, the gateway device has at least one multipole connector that has the at least one plug-in contact associated with it. The connector can be in the form of a male plug-in connection having pin-shaped plug-in contacts, or in the form of a female plug-in connection having a plug socket in which plug-in contacts are arranged. Preferably, at least one of the plug-in contacts is configurable, in particular has a multiple, in particular dual, function, while at least one further plug-in contact is not configurable, in particular performs an invariable function, such as for example an input for a supply voltage, an earth connection, an output for an LED, or a connection for the vehicle ignition. In particular, a multipole connector having a plug configuration selected according to the disclosure is able to have a wiring harness connected to it that is provided in a manner specific to the vehicle and/or air-conditioning device and the lines of which are arranged according to the desired plug configuration. In particular, the arrangement of the plug-in contacts in a connector is of standard design.

In one advantageous development of the disclosure, the gateway device has at least one first, preferably 16-pole, connector and a second, preferably 12-pole, connector. A first connector can be configurable for standard functions that are typically required for an, in particular retrofittable, air-conditioning device in vehicles. A second connector can be configurable in particular for optional additional functions, the second connector also being able to be unused during the operation of an air-conditioning device. In this manner, the flexible usability of the gateway device is increased further.

The cited object is additionally achieved by a vehicle in accordance with claim 13, in particular by a vehicle that comprises a gateway device according to the disclosure.

The cited object is additionally achieved by a method in accordance with claim 14 that comprises in particular the fitting of a gateway device according to the disclosure.

In particular, the object is achieved by a method for starting up an air-conditioning device, in particular an independent vehicle heater, in a vehicle, comprising the following steps:
- fitting a gateway device, in particular according to the disclosure, for controlling the air-conditioning device in the vehicle;
- transmitting, preferably wirelessly, air-conditioning-device-specific and/or vehicle-specific configuration data to a reception unit of the gateway device;
- executing at least one control command, which is produced on the basis of the configuration data, for selecting a plug configuration of the gateway device, in particular by means of a configuration circuit associated with a plug-in contact.

The method according to the disclosure has similar advantages to those already described in connection with the gateway device according to the disclosure. The method can additionally implement some or all method features described in connection with the gateway device. The method according to the disclosure has in particular the advantage that a gateway device is fitted as a hardware component manufactured in the standard manner and, in particular on the basis of a piece of configuration software, is configurable for a specific vehicle and/or air-conditioning-device model by means of transmitted configuration data, depending on the prescribed technical specifications. Preferably, configuration data are transmitted to the gateway device via a wireless interface, such as e.g. Bluetooth, WLAN or Wifi, LTE or GSM, and are preferably stored. In particular, configuration data are read from a data memory of the gateway device and control commands on the basis of which a configuration circuit is connected are produced from said configuration data by a control program executed on the gateway device. Such a method allows the work time required for retrofitting an air-conditioning device and starting it up in a vehicle to be considerably reduced. In particular, no special gateway devices having appropriately provided plug configurations for different vehicle models and/or air-conditioning devices need to be provided, kept in stock and in each case differently wired.

In one advantageous development of the method according to the disclosure, there is provision for the gateway device to be connected to the air-conditioning device and/or to a vehicle component, preferably by plugging connecting lines into a connector of the gateway device, which connector is configured in a manner specific to the air-conditioning device and/or to the vehicle. The connecting of the gateway device to the air-conditioning device and/or to a vehicle component can be understood to mean direct or indirect connection. In the case of indirect connection, it is in particular possible for line sections, preferably a wiring harness, and further components to be interposed. In particular, a wiring harness provided in a manner specific to the air-conditioning device and/or vehicle is plugged into at least one suitable configured connector of the gateway device. The method has the advantage that possible errors during wiring are avoidable.

Exemplary embodiments of the disclosure are described in more detail below on the basis of the drawings, in which.

In the description of the disclosure that follows, the same reference signs are used for elements that are the same and have the same effect.

Figure 1:
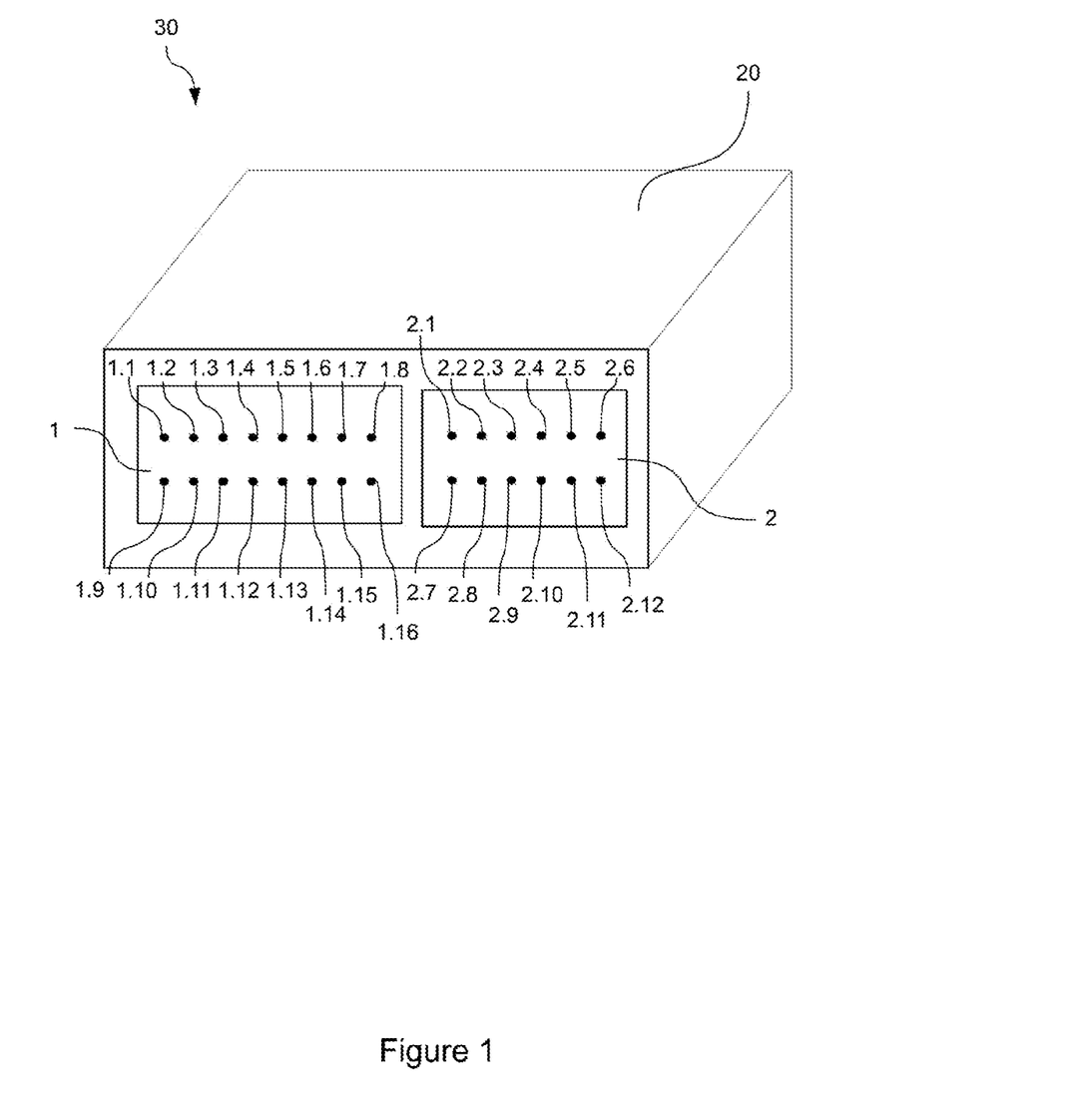
FIG. 1 shows a schematic depiction of an embodiment of a gateway device according to the disclosure in a perspective view.

FIG. 1 shows a gateway device 30 according to the disclosure in a housing 20, said gateway device having a first connector 1 and a second connector 2. The first connector 1 is in 16-pole form, that is to say has 16 plug-in contacts 1.1 to 1.16. The second connector 2 is in 12-pole form, that is to say has 12 plug-in contacts 2.1 to 2.12. The plug-in contacts are embodied as contact pins in this case. Some of the plug-in contacts 1.1 to 1.16 and 2.1 to 2.12 are variably configurable, in particular programmable, so that they can perform a specific function. The other plug-in contacts are not configurable and perform an invariable function prescribed by their interconnection. The configurable plug-in contacts have an associated configuration circuit that connects up the plug-in contact depending on the switching state such that it can perform a function corresponding to the interconnection. In this respect, a configurable plug-in contact can perform a multiple function, in particular dual function. A desired plug configuration is selectable by means of configuration data transmitted to the gateway device 30.

Figure 2:
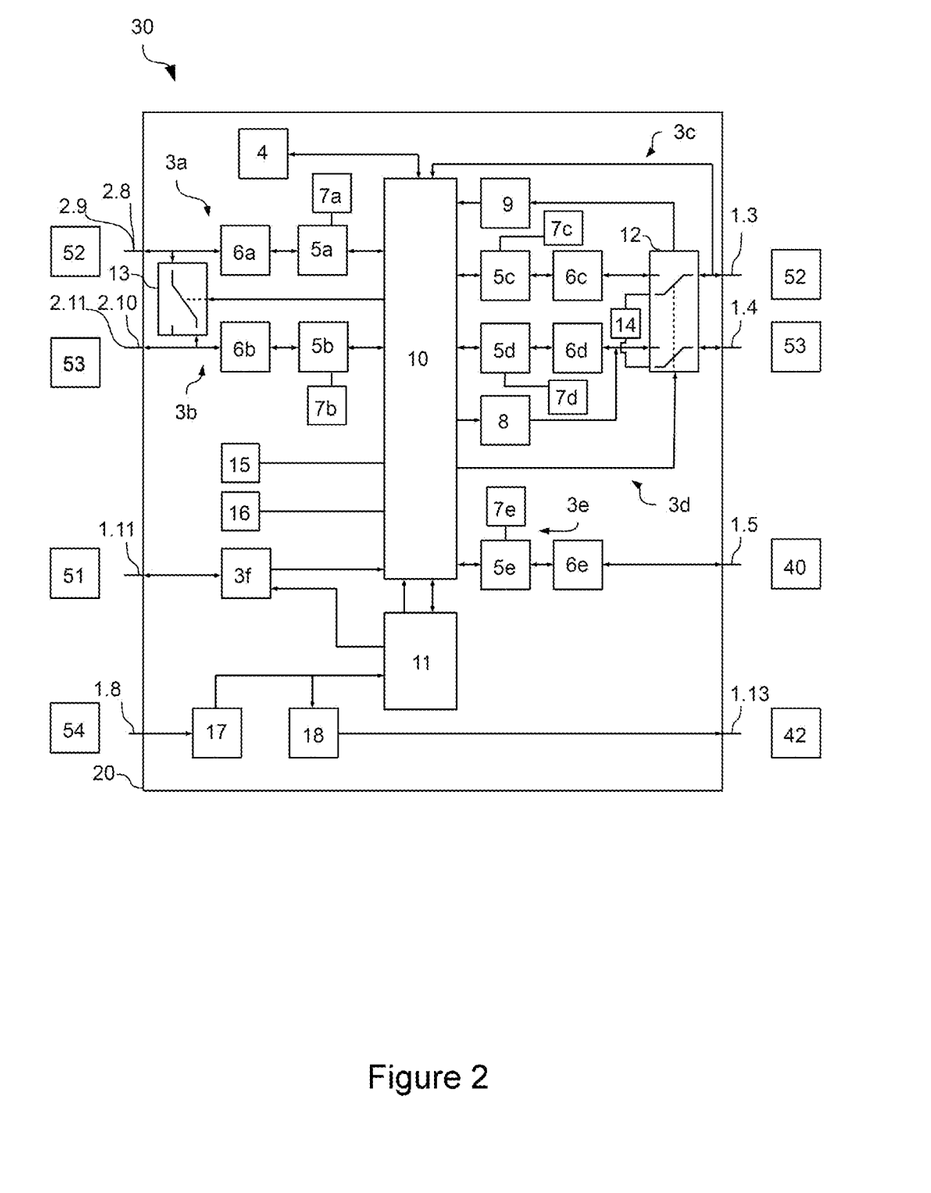
FIG. 2 shows a schematic block diagram of an embodiment of a gateway device according to the disclosure.

FIG. 2 shows a depiction of an embodiment of a gateway device 30 according to the disclosure in a block diagram. The gateway device 30 comprises a microcontroller 10, which in particular comprises a computing unit and a memory unit, and a power management integrated circuit, PMIC, 11. Additionally, the gateway device comprises an internal temperature sensor 15 and an internal pressure sensor 16 in order to record an ambient temperature or pressure of the gateway device, in particular an interior vehicle temperature or pressure, in order to take this as a basis for producing control commands for an air-conditioning device. The gateway device 30 comprises a Bluetooth reception unit 4 for wirelessly receiving configuration data transmitted to the gateway device 30, for example in a garage, in order to select a plug configuration for those configurable plug-in contacts from all the plug-in contacts 1.1 to 1.16 and 2.1 to 2.12. Configurable plug-in contacts 1.3, 1.4, 1.5, 1.11, and also 2.8 and 2.9 and 2.10 and 2.11, are depicted that are variably interconnectable by means of configuration circuits 3a to 3f. Using the plug-in contact 1.8, the gateway device 30 is connectable to a supply voltage, in particular to the positive pole of a vehicle battery 54, e.g. at 12 V, 24 V, 32 V or 48 V. A DC-DC voltage converter 17 converts the incoming supply voltage, in particular to a suitable supply voltage, e.g. 12 V, for other subassemblies of the gateway device, such as e.g. different circuits, to which the PMIC 11 is also connected. The PMIC 11 supplies power to the microcontroller 10 and is communicatively connected thereto. The self-resetting fuse 18, which in particular has a PTC resistor, ensures that the gateway device 30 is not damaged by an operator control element 42 connectable to the contact 1.13, for example a switch for manually controlling the air-conditioning device 40, in the event of a short.

The configuration circuits 3a and 3b are associated with the plug-in contacts 2.8 and 2.9, and 2.10 and 2.11, respectively, which are each in the form of a two-wire data bus connection, e.g. in the form of a CAN bus connection, to which e.g. a fan 52 and/or a ventilator flap 53 is connectable. Using bus termination circuits 6a and 6b, the plug-in contacts can be connected up to a suitable terminating resistor, e.g. of 120Ω. The bus transceivers 5a and 5b are protected against overheating by means of temperature sensors 7a and 7b, respectively. The relay 13 switchable by the microcontroller 10 comprises a conductor track fuse (not depicted) that protects the plug-in contacts 2.8, 2.9 and 2.10, 2.11, in particular in an unconfigured state, against a short, for example in the event of incorrect wiring of the gateway device 30. A conductor track fuse has the advantage that the bus communication, in particular of a sensitive CAN bus system, is not disturbed thereby.

The configuration circuits 3c and 3d are associated with the plug-in contacts 1.3 and 1.4, respectively. The plug-in contact 1.3 is configurable either as a LIN bus connection or as a PWM input in a first or second switching state, respectively. The plug-in contact 1.4 is configurable either as a LIN bus connection or as a PWM output in a first or second switching state, respectively. Using bus termination circuits 5a and 5b, the plug-in contacts 1.3 and 1.4 can be connected up to suitable terminating resistors: the plug-in contact 1.3 to 30 kΩ, for example, and the plug-in contact 1.4 to either 1 kΩ or 30 kΩ, for example. The bus transceivers 5a and 5b are protected against overheating by means of temperature sensors 7a and 7b, respectively. The relay 12 switchable by the microcontroller 10 comprises a self-resetting fuse 14 that in particular comprises a PTC resistor that protects the plug-in contacts 1.3 and 1.4, in particular in an unconfigured state, against a short. The configuration circuit 3c comprises a PWM output circuit 8, in particular in order to amplify a PWM signal. As a result of the configuration circuit 3d, the duty factor of the output PWM signal is freely selectable and/or the amplitude voltage can be regulated up to the level of the supply voltage of the gateway device 30, e.g. up to 12 V, 24 V, 32 V or 48 V. The plug-in contact 1.3 is able to have for example a fan 52 or a ventilator flap 53 connected to it, the motors of which are controllable by a PWM signal, for example in respect of the speed or a flap opening angle. The configuration circuit 3d comprises a PWM input circuit 9 in order to read a PWM signal that is input via the plug-in contact 1.3 of the gateway device 30.

The configuration circuit 3e is associated with the plug-in contact 1.5, which is configurable as a LIN bus connection in a first switching state and as a proprietary bus connection, in this case as a W bus connection, in particular for connecting an air-conditioning device 40 via an air-conditioning bus line 41, in particular for transmitting control commands to a heater 43, in a second switching state. The bus transceiver 5e is protected against overheating by means of a temperature sensor 7e. Using a bus termination circuit 6e, the plug-in contact 5.1 is able to be selectively connected up to a terminating resistor of 1 kΩ, 10 kΩ or 30 kΩ.

The configuration circuit 3*f* is associated with the plug-in contact 1.11, which is in the form of a general purpose input/output plug-in contact in a first switching state and in the form of an analogue measurement input, in particular for connecting an external temperature sensor 51, in a second switching state. An external temperature sensor is embodied e.g. as an NTC or PTC temperature sensor.

The embodiment of the gateway device 30 according to the disclosure that is depicted in FIG. 2 represents configurable plug-in connections in exemplary fashion. There can be provision for additional or differently embodied configuration circuits or fewer configuration circuits, in particular subcombinations of the depicted configuration circuits 3*a* to 3*f*. A gateway device 30 according to the disclosure has the advantage that the contacts are configurable such that the gateway device can be used for a multiplicity of different vehicles 50 and/or air-conditioning devices 40 without altering the hardware of the gateway device 30 for that purpose. Loading a suitable plug configuration by transmitting configuration data renders the gateway device 30 usable in flexible fashion.

Figure 3:
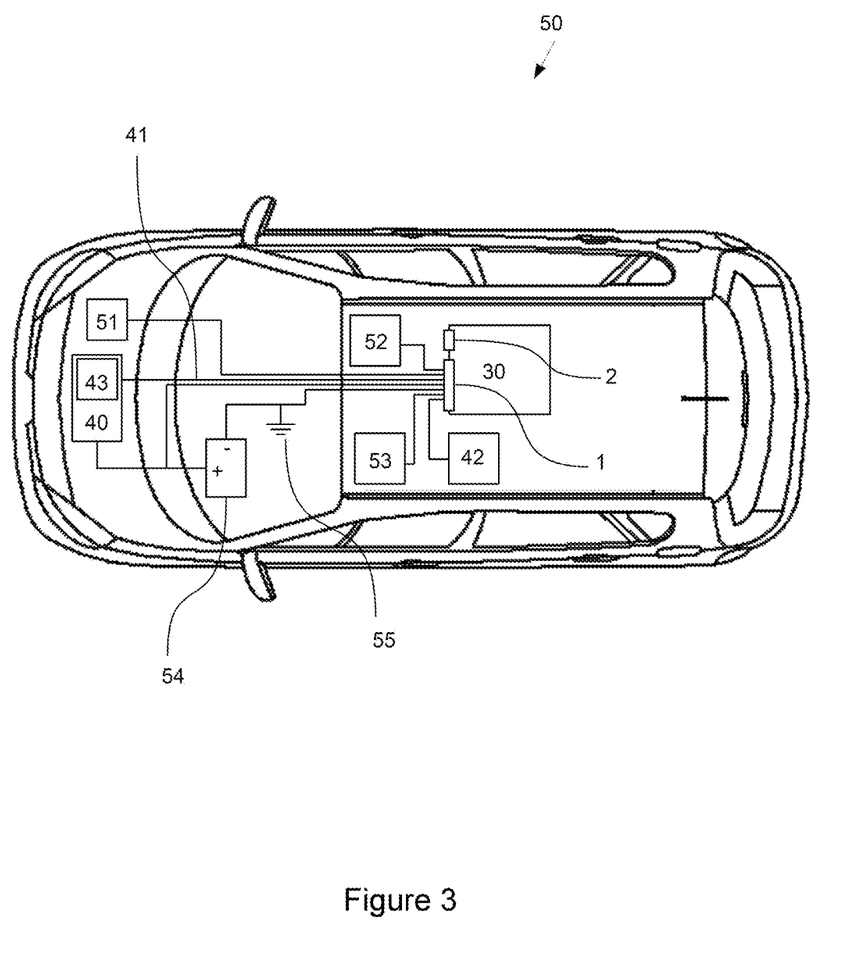
FIG. 3 shows a schematic depiction of an embodiment of a vehicle according to the disclosure with a gateway device according to the disclosure.

FIG. 3 shows a vehicle 50 in which a gateway device 30 according to the disclosure is fitted that has a first connector 1 and a second connector 2, the second connector 2 being unused in this case. The gateway device 30 is connected to an earth connection 55, a vehicle battery 54, to a heater 43 via an air-conditioning bus line 41 (W bus) of a retrofitted air-conditioning device 40, to an operator control element 42, an external temperature sensor 51, a fan 52 and a ventilator flap 53. The plug configuration of the plug-in contacts 1.1 to 1.16 of the gateway device 30 is selected such that the cited preinstalled vehicle components and retrofitted components of the air-conditioning device 40 are connected as appropriate by means of the suitably configured connector 1 via a vehicle-specific and/or air-conditioning-device-specific wiring harness. The retrofitting and startup of an air-conditioning device 40 in a vehicle 50 having such a gateway device 30 is performable easily, quickly and reliably.

At this junction, it should be pointed out that all parts described above, considered on their own and in any combination, in particular the details depicted in the drawings, are claimed as essential to the disclosure. Modifications thereto are familiar to a person skilled in the art. In particular, a person skilled in the art is familiar with combining the individual exemplary embodiments in any form.

LIST OF REFERENCE SIGNS

1 Connector
1.1 to 1.16 Plug-in contacts
2 Connector
2.1 to 2.12 Plug-in contacts
3*a* to 3*f* Configuration circuit
4 Bluetooth reception unit
5*a* to 5*e* Bus transceiver
6*a* to 6*e* Bus termination circuit
7*a* to 7*e* Temperature sensor
8 PWM output circuit
9 PWM input circuit
10 Microcontroller
11 PMIC
12 Relay
13 Relay
14 Self-resetting fuse
15 Internal temperature sensor
16 Internal pressure sensor
17 DC-DC voltage converter
18 Self-resetting fuse
20 Housing
30 Gateway device
40 Air-conditioning device
41 Air-conditioning bus line
42 Operator control element
43 Heater
50 Vehicle
51 External temperature sensor
52 Fan
53 Ventilator flap
54 Vehicle battery
55 Earth connection

The invention claimed is:

1. A gateway device for controlling an air-conditioning device of a vehicle, comprising:
    at least one plug-in contact for connecting the gateway device to an air-conditioning device and/or to a vehicle component;
    a reception unit for receiving configuration data for selecting a plug configuration of the gateway device;
    a configuration circuit, associated with the plug-in, that is designed to take configuration data as a basis for changing over between at least one first switching state of the plug-in, in which the plug-in contact is designed to perform a first function, and at least one second switching state of the plug-in contact, in which the plug-in contact is designed to perform a second function.

2. The gateway device according to claim 1, wherein the plug-in contact is in the form of an output contact in a first switching state and in the form of an input contact in a second switching state.

3. The gateway device according to claim 1, wherein the plug-in contact is in the form of an analogue connection in a first switching state and in the form of a digital connection in a second switching state.

4. The gateway device according to claim 1, wherein_the plug-in contact is able to have a first voltage value applied to it or tapped off from it in a first switching state and a second voltage value applied to it or tapped off from it in a second switching state, wherein the plug-in contact is in the form of a data bus connection for bidirectional data communication, preferably in the form of a Controller Area Network (CAN) bus connection.

5. The gateway device according to claim 1, wherein_the plug-in contact is in the form of a data bus connection for bidirectional data communication in a first switching state and designed to transmit a Pulse-Width Modulated (PWM) signal or in the form of a proprietary bus connection in a second switching state.

6. The gateway device according to claim 1, wherein the plug-in contact is connected up to a first bus terminating resistor in a first switching state and to a second bus terminating resistor in a second switching state.

7. The gateway device according to claim 1, wherein the reception unit is designed to receive configuration data wirelessly.

8. The gateway device according to claim 1, wherein the gateway device comprises at least one temperature sensor for recording a component temperature.

9. The gateway device according to claim 1, wherein_a plug-in contact is connected to a self-resetting fuse that has a positive temperature coefficient (PTC) thermistor.

10. The gateway device according to claim 1, wherein a plug-in contact in the form of an output contact has an associated checking circuit designed to tap off the output voltage present on the plug-in contact.

11. The gateway device according to claim 1, wherein the gateway device has at least one multipole connector that has the at least one plug-in contact associated with it.

12. The gateway device according to claim 1, wherein the gateway device comprising at least one first 16-pole connector and a second 12-pole connector.

13. Vehicle comprising a gateway device according to claim 1.

14. The gateway device for controlling an air-conditioning device of a vehicle according to claim 4, wherein the air-conditioning device is retrofitted.

15. The gateway device according to claim 1, wherein the plug-in contact is in the form of a LIN bus connection.

16. The gateway device according to claim 1, wherein the reception unit is designed to receive configuration by means of Bluetooth.

17. The gateway device according to claim 1, wherein the gateway device comprises at least one temperature sensor for recording a temperature of a bus transceiver.

18. The gateway device according to claim 1, wherein a plug-in contact is connected to a self-resetting fuse that has a positive temperature coefficient (PTC) thermistor in the form of a conductive polymer.

19. A method for starting up an air-conditioning device in a vehicle, comprising the following steps:
   fitting a gateway device according to claim 1, for controlling the air-conditioning device in the vehicle;
   transmitting air-conditioning-device-specific and/or vehicle-specific configuration data to a reception unit of the gateway device;
   executing at least one control command, which is produced on the basis of the configuration data, for selecting a plug configuration of the gateway device.

20. The method according to claim 19, wherein connecting the gateway device to the air-conditioning device and/or to a vehicle component by plugging connecting lines into a connector of the gateway device, which connector is configured in a manner specific to the air-conditioning device and/or to the vehicle.

* * * * *